United States Patent
Sano et al.

(10) Patent No.: US 8,890,385 B2
(45) Date of Patent: Nov. 18, 2014

(54) ROTOR FOR ROTARY ELECTRIC MACHINE

(75) Inventors: Shinya Sano, Toyota (JP); Akifumi Kurokawa, Kariya (JP)

(73) Assignees: Toyota Jidosha Kabushiki Kaisha, Aichi-ken (JP); Aisin Seiki Kabushiki Kaisha, Aichi-ken (JP)

( * ) Notice: Subject to any disclaimer, the term of this patent is extended or adjusted under 35 U.S.C. 154(b) by 384 days.

(21) Appl. No.: 13/364,383

(22) Filed: Feb. 2, 2012

(65) Prior Publication Data
US 2012/0200187 A1    Aug. 9, 2012

(30) Foreign Application Priority Data
Feb. 3, 2011    (JP) ................. 2011-021418

(51) Int. Cl.
    H02K 1/27    (2006.01)
(52) U.S. Cl.
    CPC ............................ H02K 1/2766 (2013.01)
    USPC ........................ 310/156.07; 310/156.53
(58) Field of Classification Search
    CPC .............................. H02K 21/14; H02K 21/16
    USPC ........... 310/156.07, 156.53, 156.56, 156.57, 310/156.75
    See application file for complete search history.

(56) References Cited

U.S. PATENT DOCUMENTS

| | | | |
|---|---|---|---|
| 2009/0134732 A1 | 5/2009 | Shichijoh et al. | |
| 2012/0139382 A1* | 6/2012 | Yamagishi et al. | 310/156.61 |
| 2012/0200185 A1 | 8/2012 | Sano et al. | |
| 2012/0200186 A1 | 8/2012 | Sano et al. | |
| 2012/0200188 A1 | 8/2012 | Sano et al. | |
| 2012/0200193 A1 | 8/2012 | Sano et al. | |

FOREIGN PATENT DOCUMENTS

| | | | | | |
|---|---|---|---|---|---|
| JP | 10051984 | A | * | 2/1998 | ............... H02K 1/27 |
| JP | 11113198 | A | * | 4/1999 | ............... H02K 1/27 |
| JP | 11-243653 | A | | 9/1999 | |
| JP | 2001-145283 | A | | 5/2001 | |
| JP | 2002-354728 | A | | 12/2002 | |
| JP | 2003-158838 | A | | 5/2003 | |
| JP | 2006-311772 | A | | 11/2006 | |
| JP | 2006314152 | A | * | 11/2006 | |
| JP | 2008067474 | A | * | 3/2008 | |
| JP | 2008104353 | A | * | 5/2008 | |
| JP | 2009-124899 | A | | 6/2009 | |

(Continued)

OTHER PUBLICATIONS

Narita et al., JP11113198 Machine Translatin, Apr. 1999.*

*Primary Examiner* — Burton Mullins
*Assistant Examiner* — Eric Johnson
(74) *Attorney, Agent, or Firm* — Sughrue Mion, PLLC

(57) ABSTRACT

A rotor for a rotary electric machine has a plurality of magnetic poles provided at intervals in a circumferential direction of a rotor core, at an outer periphery of the rotor core. Each of the magnetic poles includes a central magnet, a pair of circumferential-direction magnets disposed on both sides of the central magnet in the circumferential direction such that a spacing between the pair widens towards an outer periphery of the rotor core, and low permeability regions provided in the vicinity of end portions of the central magnet in the circumferential direction, and having a permeability lower than a magnetic material of the rotor core. The rotor core is formed such that a width of a magnetic path entrance portion that is formed between a magnetic-pole inward side face of the circumferential-direction magnet and the adjacent low permeability region decreases towards an outer peripheral face of the rotor core.

9 Claims, 6 Drawing Sheets

(56) References Cited

FOREIGN PATENT DOCUMENTS

| | | |
|---|---|---|
| JP | 2012-161226 A | 8/2012 |
| JP | 2012-161227 A | 8/2012 |
| JP | 2012-165480 A | 8/2012 |
| JP | 2012-165481 A | 8/2012 |
| JP | 2012-165482 A | 8/2012 |
| WO | WO 2008150035 A1 * 12/2008 ............... H02K 1/27 |
| WO | 2012/104715 A1 | 8/2012 |

\* cited by examiner

F I G . 3
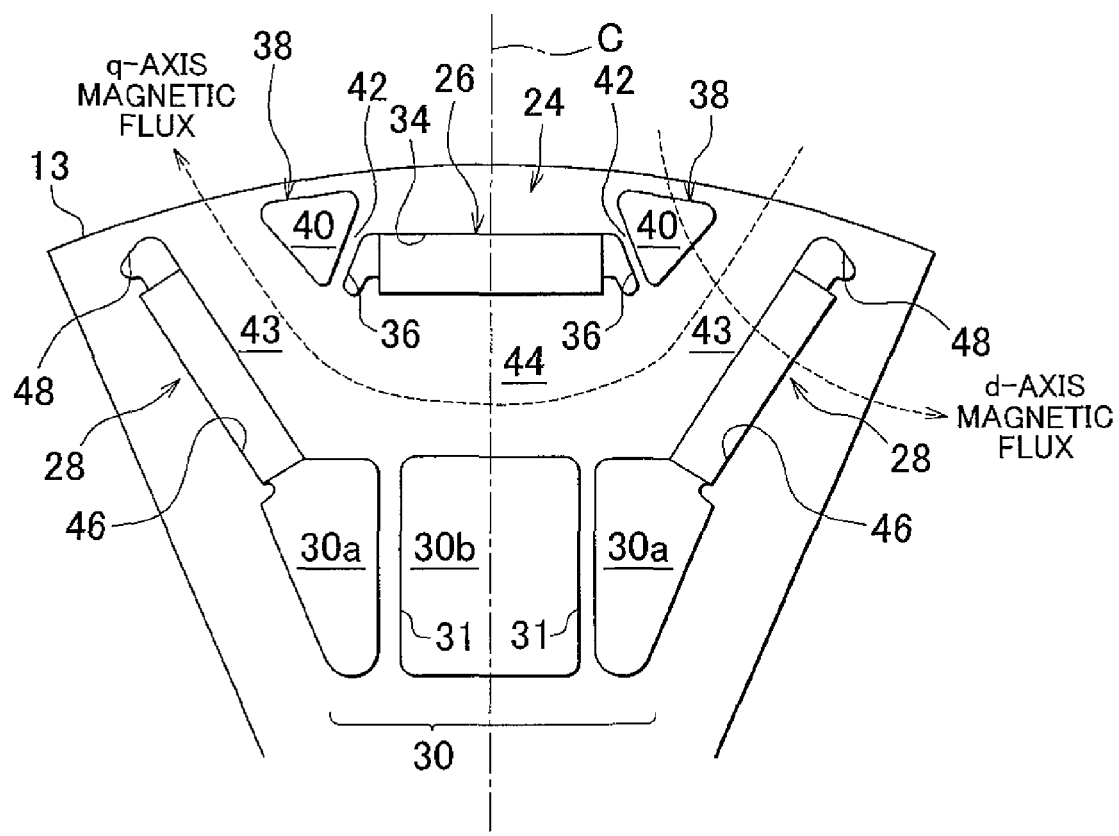

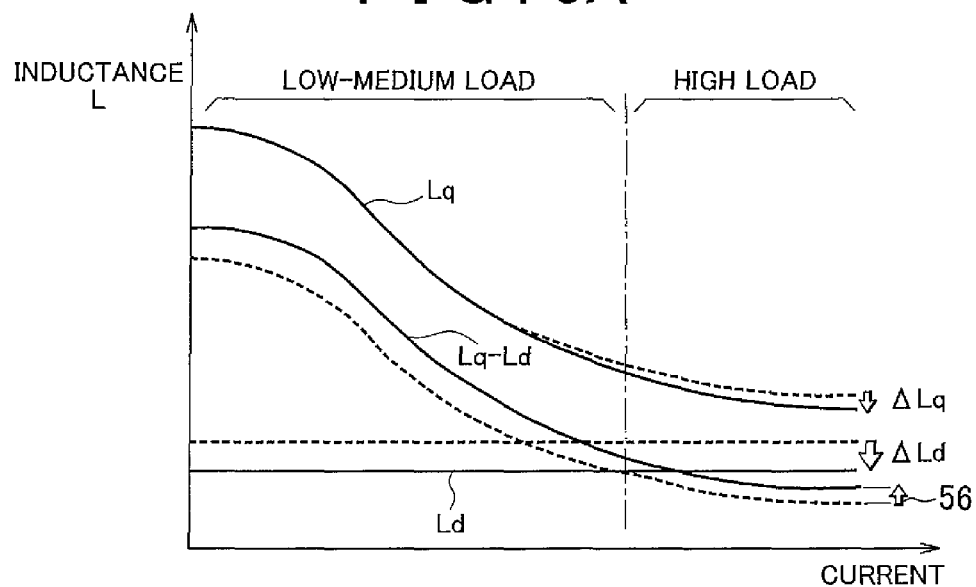
F I G. 5A
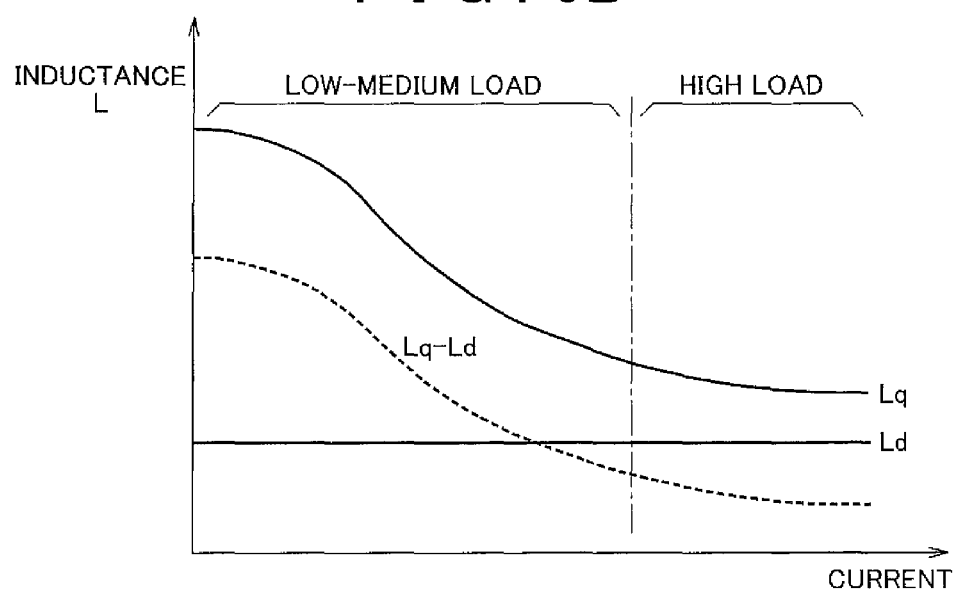
F I G. 5B

ROTOR FOR ROTARY ELECTRIC MACHINE

INCORPORATION BY REFERENCE

The disclosure of Japanese Patent Application No. 2011-021418 filed on Feb. 3, 2011 including the specification, drawings and abstract is incorporated herein by reference in its entirety.

BACKGROUND OF THE INVENTION

1. Field of the Invention

The invention relates to a rotor for a rotary electric machine, and more particularly to a rotor for a rotary electric machine in which a plurality of magnetic poles are disposed at intervals, in a circumferential direction, at an outer periphery of a rotor core.

2. Description of Related Art

For example, Japanese Patent Application Publication No. 2001-45283 (JP-A-2001-145283) discloses a conventional rotor 60 of a permanent magnet-type rotary electric machine in which a plurality of magnetic poles 62 having a configuration such as the one illustrated in FIG. 6 are provided, at equal intervals, in the circumferential direction of a rotor core 64. The magnetic poles 62 of the rotor 60 are made up of four permanent magnets 66, 68a, 68b, 70.

The four permanent magnets are disposed so as to form a quadrangle, more specifically a trapezoid, in a cross section of the rotor core 64. Specifically, a first permanent magnet 66 is disposed at an outer periphery of a rotor core 64, in the center of the magnetic pole 62 in the circumferential direction. Second permanent magnets 68a, 68b are disposed, substantially along radial direction, on both sides of the first permanent magnet 66, at positions spaced apart from each other in the circumferential direction. A third permanent magnet 70 is disposed on an inner periphery side in the radial direction of the rotor core 64, facing in the direction of the first permanent magnet 66.

The first permanent magnet 66 is disposed in a main portion 74a of a magnet groove 74 that is formed, extending in the axial direction, in the rotor core 64. The magnet groove 74 has sub-portions 74b, 74c on both sides of the main portion 74a, in the circumferential direction, such that the sub-portions 74b, 74c communicate with the main portion 74a. Leading end portions 74x, 74y of the sub-portions 74b, 74c of the magnet groove 74 are formed so as to project towards the outer periphery. The second permanent magnets 68a, 68b are respectively disposed inside main portions 76a of magnet grooves 76 that are formed, extending in the axial direction, in the rotor core 64. The magnet grooves 76 include respective sub-portions 76b that extend outward in the radial direction of the abovementioned main portions 76a.

In the magnetic pole 62 of the rotor 60, a core region is formed, as a magnetic path central portion 72, between the first permanent magnet 66 and the third permanent magnet 70. Magnetic path entrance portions 73 are formed between the sub-portions 74b, 74c of the magnet groove 74, the second permanent magnets 68a, 68b, and the sub-portions 76b of the magnet groove 76. The magnetic path central portion 72 is linked to the outer peripheral face of the rotor core 64 via the magnetic path entrance portions 73 on both sides of the first permanent magnet 66 in the circumferential direction. The two magnetic path entrance portions 73 on both sides of the first permanent magnet 66 in the circumferential direction cause magnetic flux from the stator (not shown) that penetrates into the rotor core 64 to be drawn from one of the magnetic path entrance portions 73 out through the other, through the magnetic path central portion 72. In the case of a reversed flow direction of the magnetic flux, however, the inlet and outlet of magnetic flux are reversed, and hence both portions are referred to as magnetic path entrance portions.

Herein, JP-A-2001-145283 indicates that in the rotor 60 having a magnetic pole 62 configured as described above, no magnetic flux is received, in the reverse direction of the magnetization direction, at both end portions of the first permanent magnet 66 in the circumferential direction, by virtue of the presence of the sub-portions 74b, 74c, which include voids (or a resin) of lower permeability than that of the core material, on both sides of the first permanent magnet 66. As a result, degaussing does not occur in the first permanent magnet 66.

In the rotor 60 of JP-A-2001-145283, the sub-portions 74b, 74c of the magnet groove 74 are disposed parallel to the second permanent magnet 68a, 68b and the sub-portions 76b of the magnet groove 76, and the magnetic path entrance portions 73 formed therebetween have constant width. In this case, the magnetic flux leaking from the circumferential-direction end portion of the first permanent magnet 66 and the magnetic flux from the second permanent magnets 68a, 68b concentrate at the inner-periphery-side portion of the magnetic path entrance portion 73 when there increases the amount of magnetic flux that flows from the stator during high load operation of the rotary electric machine that is provided with a rotor 60. The q-axis inductance Lq of the magnetic pole 60 may drop significantly as a result, and, in consequence, reluctance torque during high load operation may be harder to obtain, and torque generation efficiency may drop accordingly.

Herein, d-axis inductance Ld is predominant, upon high load operation of the rotary electric machine, in the reluctance torque, which increases proportionally to the difference between the q-axis inductance Lq and the d-axis inductance Ld. Accordingly, there is room for improvement regarding this feature.

SUMMARY OF THE INVENTION

The invention provides a rotor for a rotary electric machine that allows improving torque generation efficiency through an increase in reluctance torque during high-load rotation in a rotary electric machine.

The rotor for a rotary electric machine according to an aspect of the invention has a rotor core in which a plurality of magnetic poles are provided, at intervals in a circumferential direction of the rotor core, at an outer periphery of the rotor core, wherein each of the magnetic poles includes a central magnet provided in the vicinity of an outer peripheral face of the rotor core, a pair of circumferential-direction magnets disposed on both sides of the central magnet in the circumferential direction such that a mutual spacing between the pair widens towards an outer periphery of the rotor core, and a low permeability region provided in the vicinity of each of end portions of the central magnet in the circumferential direction, and having a permeability lower than that of a magnetic material, of which the rotor core is made, and the rotor core is formed in such a manner that a width of a magnetic path entrance portion that is formed between a magnetic-pole inward side face, which is an inward side face of each of the circumferential-direction magnets in the circumferential direction of the magnetic pole, and the low permeability region adjacent to the magnetic-pole inward side face becomes narrower towards the outer peripheral face of the rotor core.

Since the rotor is formed in such a manner that the width of a magnetic path that is formed between a magnetic-pole inward side face of the circumferential-direction magnet and the low permeability region becomes narrower towards the outer peripheral face of the rotor core, it becomes possible to make the amount of reduction in d-axis inductance Ld of the magnetic pole greater than the amount of reduction in q-axis inductance Lq, during high load operation. This allows, as a result, increasing reluctance torque during high load operation of the rotary electric machine. In turn, this allows enhancing the torque generation efficiency during high load operation.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a diagram illustrating an enlarged view of one magnetic pole in the rotor core illustrated in FIG. 2;

FIG. 5A is a graph schematically illustrating the variations of d-axis inductance and q-axis inductance during low-medium load operation and high load operation, in the case of an example of a rotor of the embodiment;

FIG. 5B is a graph schematically illustrating the variations of d-axis inductance and q-axis inductance during low-medium load operation and high load operation, in the case of an example of a configuration similarly to that of a conventional example.

DETAILED DESCRIPTION OF EMBODIMENTS

Embodiments of the invention will be described in detail below with reference to accompanying drawings. In the description below, specific forms, materials, numerical values, directions and so forth are merely examples for facilitating comprehension of the invention, and can be appropriately modified depending on the intended application, purpose, specifications and the like.

Figure 1:
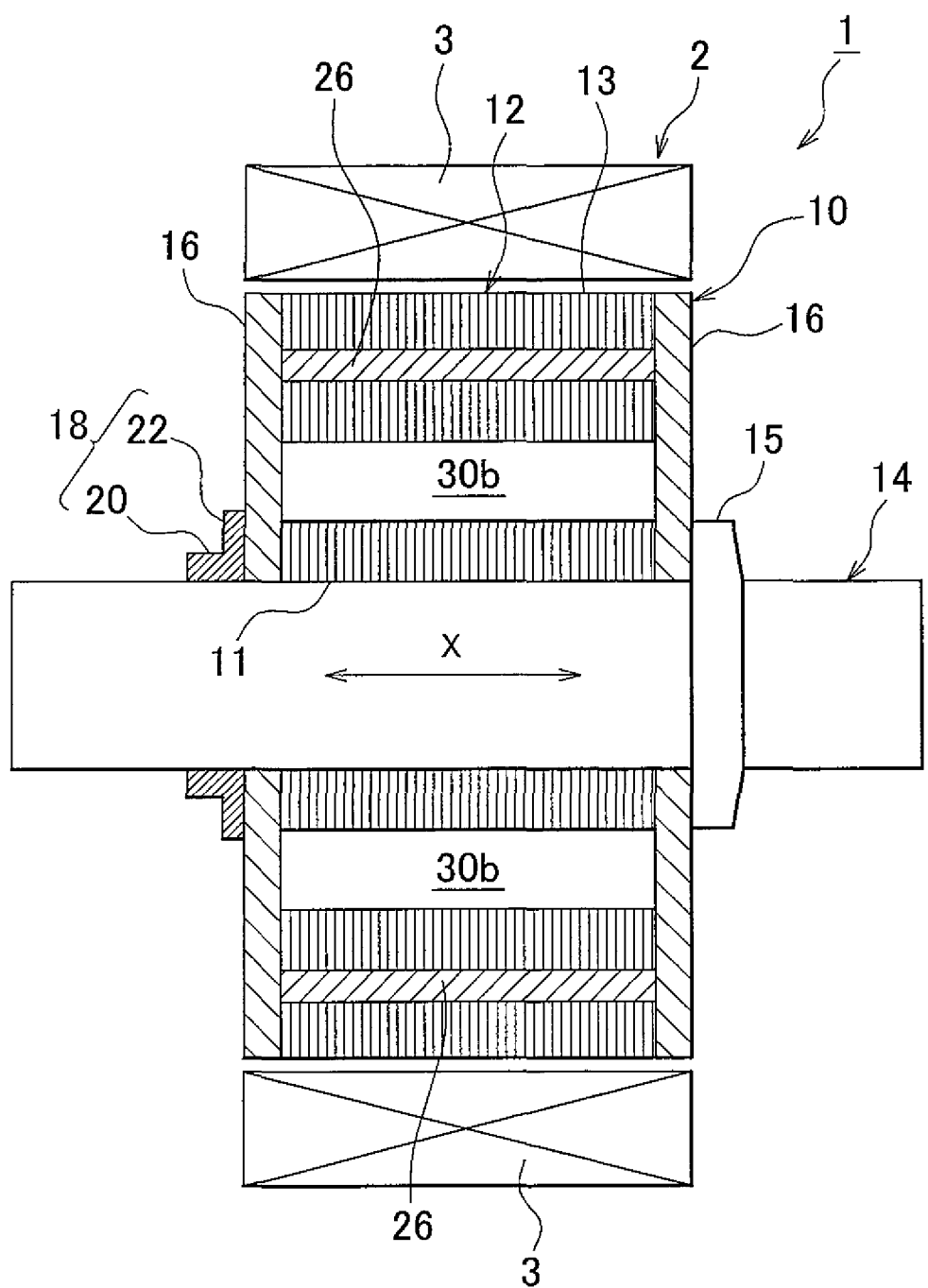
FIG. 1 is a longitudinal section along the axial direction of a rotary electric machine provided with a rotor for a rotary electric machine (hereafter, referred also simply as rotor), which is one embodiment of the invention.
Figure 2:
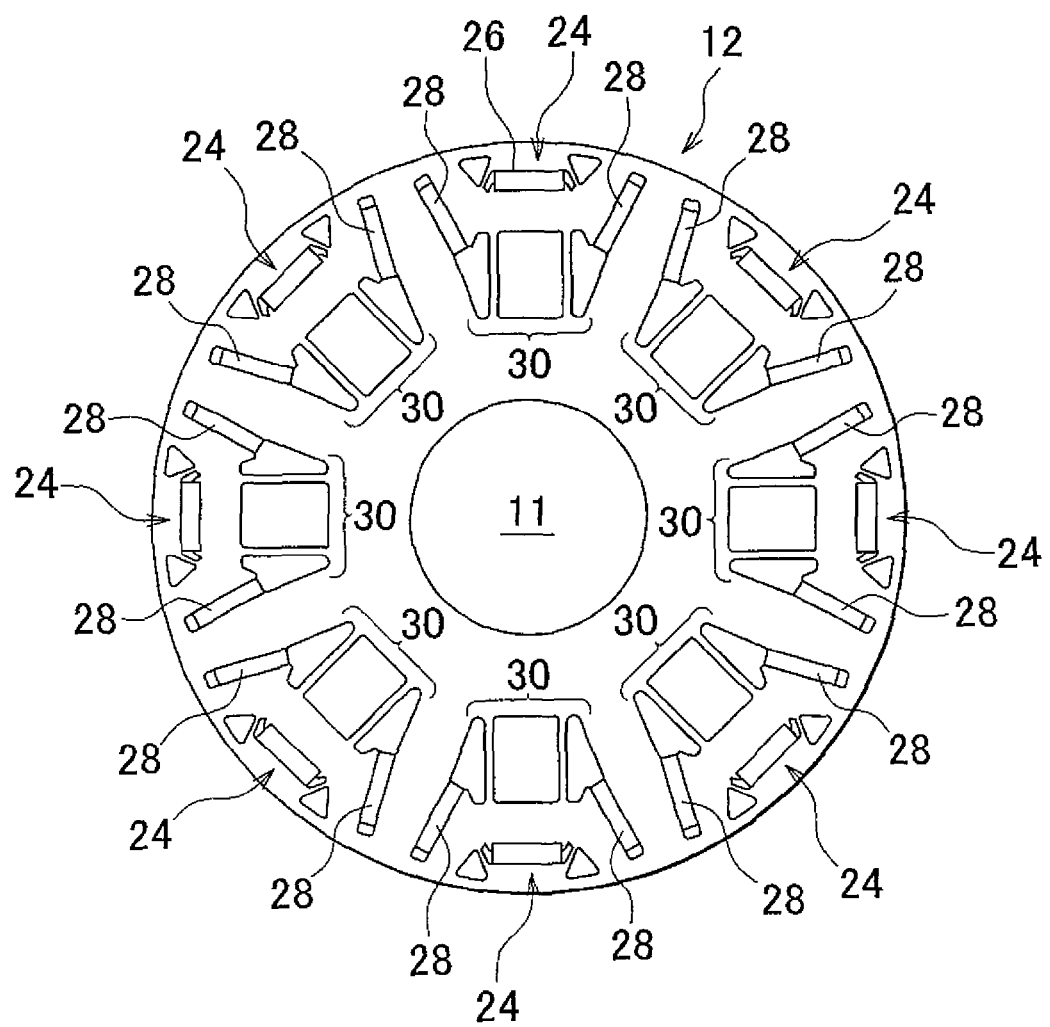
FIG. 2 is a diagram illustrating an axial-direction end face of a rotor core of the rotor illustrated in FIG. 1.

FIG. 1 illustrates a longitudinal section along the axial direction of a rotary electric machine 1 provided with a rotor 10 of the embodiment. FIG. 2 illustrates an axial-direction end face of a rotor core 12 that makes up the rotor 10.

The rotary electric machine 1 has a tubular stator 2 and a rotor 10 that is rotatably provided inside the stator 2. A plurality of teeth that point inward in a radial direction are protrusively provided, at equal spacings in the circumferential direction, on the inner periphery of the stator 2. Slots are respectively formed, in a number identical to that of the teeth, between mutually adjacent teeth, such that the slots are open on the inner periphery side and at both end portions in the axial direction. A stator coil 3 that is wound around the teeth is inserted into the slots. As a result, a rotating magnetic field is formed on the inner periphery side of the stator 2 when the stator coil 3 is energized, so that the rotor 10 is rotationally driven by the rotating magnetic field.

The stator coil 3 that is wound around the teeth may be a distributed-winding coil that spans a plurality of teeth, or may be a concentrated-winding coil that is wound around each of the teeth.

The rotor 10 includes a cylindrical rotor core 12 having a shaft hole 11 in the center of a radial direction; a shaft 14 that is passed through the shaft hole 11 of the rotor core 12 and fixed; end plates 16 that are disposed in contact with the rotor core 12, on both ends of the latter, in the axial direction of the shaft 14 (and of the rotor core 12) denoted by arrow X; and a fixing member 18 that fixes the rotor core 12 and an end plate 16 to the shaft 14.

The rotor core 12 is configured through stacking, in the axial direction, of multiple magnetic steel sheets that are each formed through punching, into a circular ring-like shape, of, for example, 0.3 mm-thick silicon steel sheets or the like. The magnetic steel sheets that make up the rotor core 12 are integrally joined to each other by methods that involve crimping, bonding, welding or the like, all sheets collectively or by dividing the rotor core 12 into a plurality of blocks in the axial direction. A plurality of magnetic poles is provided, at equal spacings in the circumferential direction, on the rotor core 12. As explained in detail below, each magnetic pole has a plurality of permanent magnets and a magnetic flux suppression hole.

The shaft 14 is formed from a round steel bar. A flange section 15 is formed on the outer periphery of the shaft 14, such that the flange section 15 projects outwards in the radial direction. The flange section functions as a stopper that determines the axial direction position of the rotor core 12 on the shaft 14, through abutment against the end plate 16 during assembly of the rotor 10. The circumferential-direction position of the rotor core 12 is fixed with respect to the shaft 14 through fixing to the shaft 14 by interference fitting, or through mounting by fitting a key, protrusively provided at an edge portion of the shaft hole 11, to a key groove on the shaft 14.

Each end plate 16 is made up of a disc having substantially the same outer shape as that of the axial-direction end face of the rotor core 12. More preferably, the end plates 16 are made of a non-magnetic metal material, for example aluminum, copper or the like. A non-magnetic metal material is used herein for the purpose of suppressing the short circuit of magnetic flux at the axial-direction end portion of the permanent magnets that make up the magnetic poles. Provided that the material thereof is a non-magnetic material, the end plates 16 are not limited to a metal material, and may be formed out of a resin material.

The end plates 16 provided on both sides of the rotor core 12 in the axial direction have, for example, a function of pressing the rotor core 12 from both ends, a function of correcting unbalance in the rotor 10 arising from partial cutting work after assembly of the rotor 10, and a function of preventing that the permanent magnets, which make up the magnetic poles, should come off the rotor core 12 in the axial direction.

In the embodiment the end plates 16 are explained and depicted in the figures as having substantially the same diameter as the rotor core 12. However, the diameter of the end plates 16 may be for example made smaller, or the end plates 16 may be omitted, to cut costs, in a case where, for example, the permanent magnets that make up the magnetic poles are fixed in the rotor core with a resin or the like.

The fixing member 18 has a crimp portion 20 of cylindrical shape, and a pressing portion 22 that protrudes outwards in the radial direction from one end portion of the crimp portion 20. The fixing member 18 is fixed to a shaft 14 through crimping of the crimp portion 20 against the shaft 14, in a state where the rotor core 12 and the two end plates 16 are pressed against the flange section 15 by the pressing portion 22. As a result, the rotor core 12 is fixed, together with the end plates 16, to the shaft 14.

As shown in FIG. 2, a shaft hole 11, for fixing of the shaft 14 through insertion in the shaft hole 11, is formed through the central portion of the rotor core 12 having a cylindrical outer shape. In a case where the rotor core 12 is fixed to the shaft 14 by interference fitting, the shaft hole 11 is circular and no key is formed at the edge portion thereof, as illustrated in FIG. 2. If the rotor core 12 is attached to the shaft 14 by key fitting, a key (or key groove) is provided protrusively (or recessed) at an edge portion of the shaft hole 11.

A plurality of magnetic poles 24 is provided, equally spaced in the circumferential direction, on the outer periphery of the rotor core 12. In the embodiment an example is illustrated in which eight magnetic poles 24 are provided at 45° spacings in the circumferential direction. Each magnetic pole 24 has the same configuration, except for the magnetization direction of the permanent magnets. Therefore, just one magnetic pole 24 will be explained below.

FIG. 3 is a diagram illustrating an enlarged view of one magnetic pole 24 of FIG. 2. FIG. 3 is a diagram illustrating one magnetic pole 24 in a state viewed from the axial-direction end face of the rotor core 12, but the configuration of cross sections that are perpendicular to the axial direction of the rotor core 12 (i.e. transversal cross-section along the radial direction) is identical to that in the figure. In FIG. 3, a magnetic pole centerline C is represented by a dashed line that is a radial-direction line passing through the center of the magnetic pole 24 in the circumferential direction.

The magnetic pole 24 includes: a central magnet 26 buried in the magnetic pole center and that extends in the circumferential direction; a pair of circumferential-direction magnets 28 that are buried spaced apart from each other, on both sides of the central magnet 26, in the circumferential direction; and a magnetic flux suppression hole 30 that is formed at a position, between the inner periphery-side end portions of the pair of circumferential-direction magnets 28, being opposed to the central magnet 26 across a magnetic path central portion 44 that is a core region.

The central magnet 26 is buried in the interior of the rotor core 12, in the vicinity of an outer peripheral face 13. The central magnet 26 is a permanent magnet having axial-direction end faces (and a cross-section perpendicular to the axial direction) that have an elongated rectangular shape having two short sides and two long sides. The central magnet 26 is formed to have substantially the same length in the axial direction as that of the rotor core 12. The long-side lateral faces of the central magnet 26 are disposed perpendicularly to the magnetic pole centerline C at positions that are line-symmetrical with respect to the magnetic pole centerline C.

The central magnet 26 is inserted into a magnet insertion hole 34 that is formed, extending in the axial direction, in the rotor core 12. Pocket portions 36 are formed on both sides, in the circumferential direction, of the magnet insertion hole 34, such that the pocket portions 36 communicate with the magnet insertion hole 34. For example, a thermosetting resin that is injected via the pocket portions 36 flows into the gap between the central magnet 26 and the inner wall face of the magnet insertion hole 34 and is cured, thereby fixing the central magnet 26 in the magnet insertion hole 34.

The resin for magnet fixing may be injected through either of the pocket portions 36, and the other of the pocket portions 36 may be left void. In any case, the pocket portions 36 have, in the interior thereof, a resin or a void that has lower permeability than that of the magnetic steel sheets that make up the rotor core 12. Therefore, the pocket portions 36 have the function of suppressing the short circuit of magnetic flux at both ends of the central magnet 26 in the circumferential direction.

Low permeability regions 38 having a lower permeability than that of the magnetic steel sheets (magnetic material) that make up the rotor core 12 are provided at positions in the vicinity of circumferential-direction end portions of the central magnet 26. Specifically, the low permeability regions 38 are configured each out of a hole having a substantially triangular cross-section that is formed, extending in the axial direction, in the rotor core 12, such that the low permeability regions 38 have each a low-permeability void in the interior thereof. The low permeability regions 38 may be formed by filling the triangular holes with a material having a permeability that is lower than that of the magnetic steel sheets, for example a resin or the like.

In the triangular through-holes 40 that form the low permeability regions 38, one side edge portion on the inward side of the magnetic pole is opposed to the pocket portion 36 across a bridge portion 42 that is a narrow core region, one side edge portion on the outer periphery side is opposed to the outer peripheral face 13 across a narrow core region, and one side edge portion on the outward side of the magnetic pole is opposed to the circumferential-direction magnet 28 across a magnetic path entrance portion 43, which is a core region. The two magnetic path entrance portions 43 on both sides of the central magnet 26 in the circumferential direction cause magnetic flux from the stator 2 that penetrates into the rotor core 12 to be drawn from one of the magnetic path entrance portions 43 out through the other, through the magnetic path central portion. In the case of a reversed flow direction of the magnetic flux, the inlet and outlet of magnetic flux are reversed, and hence both portions are referred to as the magnetic path entrance portions 43.

Similarly to the central magnet 26, the circumferential-direction magnets 28 are permanent magnets each having axial-direction end faces (and a cross-section perpendicular to the axial direction) that have an elongated rectangular shape having two short sides and two long sides, the circumferential-direction magnets 28 being formed to have an axial-direction length substantially identical to that of the rotor core 12. The circumferential-direction magnets 28 that are used may be magnets having the same shape and size as those of the central magnet 26. Using the same permanent magnets as the central magnet 26 and the circumferential-direction magnets 28 is advantageous in that doing so allows reducing costs incurred in the manufacture, control and so forth of the permanent magnets. Needless to say, the shapes or sizes of the central magnet 26 and of the circumferential-direction magnets 28 may be dissimilar.

The pair of circumferential-direction magnets 28 in the magnetic poles 24 are inserted into magnet insertion holes 46 that are formed, extending in the axial direction, inside the rotor Core 12, and are fixed with a resin. The pair of circumferential-direction magnets 28 are disposed as a result in such a manner that a mutual spacing widens towards the outer peripheral face 13 of the rotor core 12. In other words, the pair of circumferential-direction magnets 28 are disposed in such a manner that a mutual spacing becomes narrower towards the inner periphery side. The long-side lateral faces, which extends in the longitudinal direction, of the circumferential-direction magnets 28, are disposed substantially along the radial direction. The pair of circumferential-direction magnets 28 are disposed on both sides in the circumferential direction, according to a line-symmetrical relationship with respect to the magnetic pole centerline C.

A pocket portion 48 that communicates with each magnet insertion hole 46 is formed at the outer periphery side of each magnet insertion hole 46. Each pocket portion 48 is formed extending in the axial direction along the short-side lateral face of each circumferential-direction magnet 28. Each pocket portion 48 has, in the interior thereof, a void or resin having a lower permeability than that of the magnetic steel sheets. Therefore, the pocket portions 48 have the function of suppressing the short circuit of magnetic flux at the outer-periphery-side end portions of the circumferential-direction magnets 28. The resin for fixing the circumferential-direction magnets 28 may be injected via the pocket portions 48.

The magnetic flux suppression hole 30 is formed at a position (bottom in FIG. 2) inward in the radial direction, between inner periphery-side end portions of the pair of circumferential-direction magnets 28. The magnetic flux suppression hole 30 is disposed opposite the central magnet 26 across the magnetic path central portion 44. The magnetic flux suppression hole 30 has, in the interior thereof, a void of lower permeability than that of the magnetic steel sheets. Therefore, the magnetic flux suppression hole 30 has the function of suppressing or regulating the flow of magnet magnetic flux generated by the central magnet 26 and the circumferential-direction magnets 28, and the flow of magnetic flux that flows from the leading ends at the inner periphery of the teeth of the stator 2 towards the center of the magnetic path, via the magnetic path entrance portions 43 of the magnetic poles 24 of the rotor core 12.

In the embodiment, the magnetic flux suppression hole 30 is made up of two first holes 30a and one second hole 30b. The first holes 30a are formed so as to communicate with the inner-periphery-side end portions of the magnet insertion holes 46 into which the circumferential-direction magnets 28 are inserted. The first holes 30a are formed in a substantially triangular shape, at symmetrical positions on both sides of the magnetic pole centerline C. The first holes 30a have the function of suppressing the short circuit of magnetic flux at long-side direction end portions on the inner periphery of the circumferential-direction magnets 28. The resin for fixing the circumferential-direction magnets 28 may be injected into the magnet insertion holes 46, via the first holes 30a. In this case, the first holes 30a may also be filled at least partly with the abovementioned resin. Similarly to voids, the resin has low permeability, and hence the resin can fulfill the function of suppressing flow of magnetic flux, as described above.

The second hole 30b is formed between the first holes 30a, with bridge portions 31 that are narrow core regions interposed between the second hole 30b and the first holes 30a. The second hole 30b is formed in a substantially rectangular shape that is symmetrical with respect to a center that is traversed by the magnetic pole centerline C. The second hole 30b is opposed to the central magnet 26, across the magnetic path central portion 44, at a central position, in the circumferential direction, between the pair of circumferential-direction magnets 28. The second hole 30b as well includes, in the interior thereof, a void (or resin) having lower permeability than that of magnetic steel sheets. Therefore, the second hole 30b has the function of suppressing flow of magnetic flux, as described above.

In the embodiment, an example is explained wherein the magnetic flux suppression hole 30 is made up of three holes 30a, 30a, 30b, but the magnetic flux suppression hole 30 is not limited thereto, and the shape and number of holes may accommodate several variations. For example, the magnetic flux suppression hole 30 may be made up of two holes formed on both sides of one bridge portion extending along the magnetic pole centerline C, or may be formed out of one hole, with no bridge portion, or may be formed out of four or more holes. All the magnetic flux suppression holes 30 may be filled with a low-permeability material, for example a resin or the like.

A substantially trapezoidal core region, surrounded by the central magnet 26, the circumferential-direction magnets 28, and the magnetic flux suppression hole 30, is formed, as the magnetic path central portion 44, in the magnetic pole 24. Each magnetic path entrance portion 43, which is a core region, is formed between a low permeability region 38 and the corresponding circumferential-direction magnet 28 and pocket portion 48. Both circumferential-direction ends of the magnetic path central portion 44, outward in the radial direction, are linked to the outer peripheral face of the rotor core 12 via the magnetic path entrance portions 43. As a result, q-axis magnetic flux generated from the leading ends at the inner periphery of the teeth of the stator 2 passes through the rotor core 12 in a substantially U-shape or circular arc-shape, that is, the q-axis magnetic flux flows into the magnetic pole 24 through one of the magnetic path entrance portions 43, passing then through the magnetic path central portion 44, and exiting through the other magnetic path entrance portion 43. By contrast, d-axis magnetic flux from the stator 2 flows along a direction that is substantially perpendicular to that of flow of the q-axis magnetic flux, and cuts across the low permeability regions 38 and the circumferential-direction magnets 28 in the magnetic pole 24.

Figure 4:
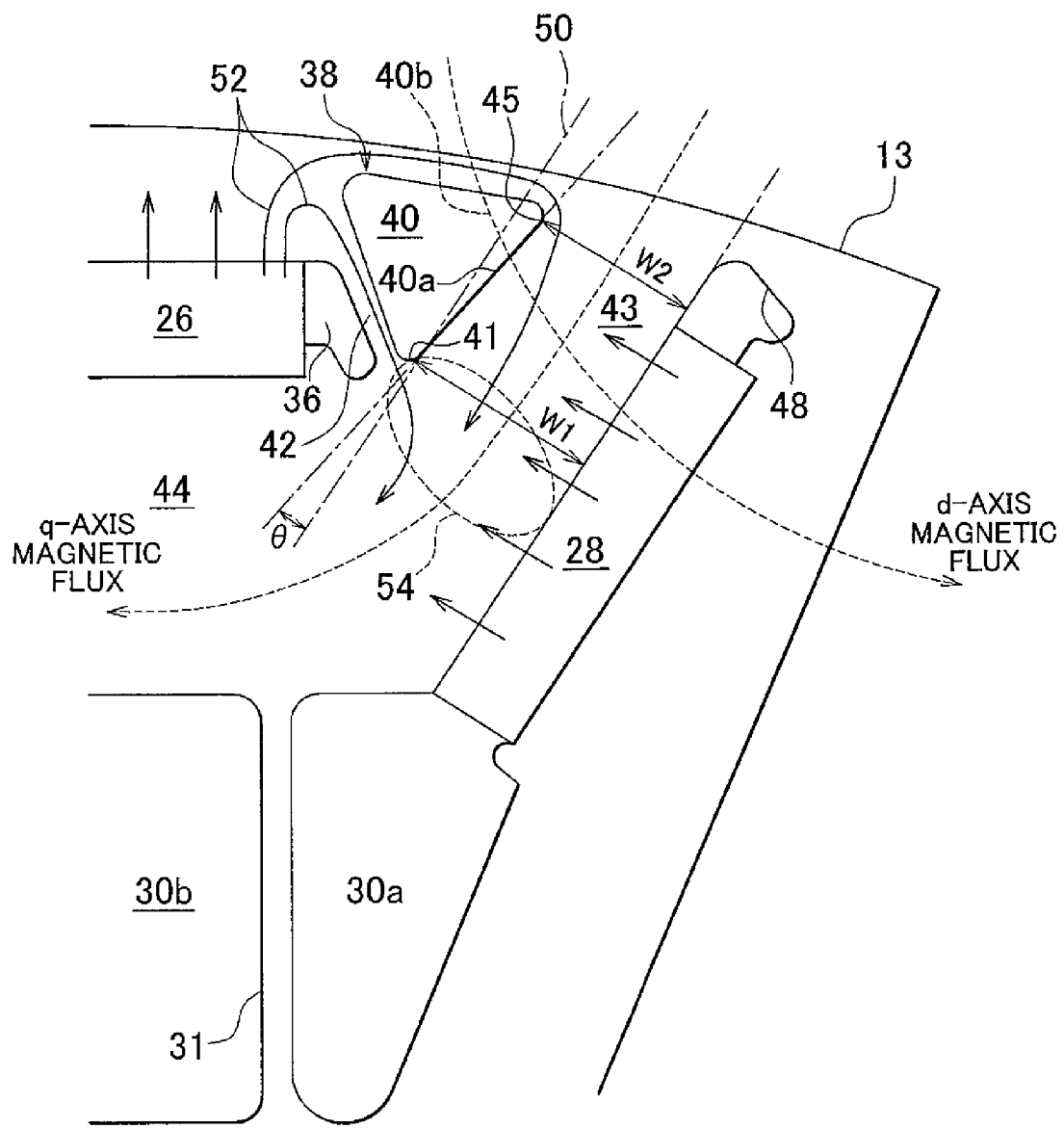
FIG. 4 is a diagram illustrating an enlarged view of one of magnetic path entrance portions in FIG. 3.
Figure 6:
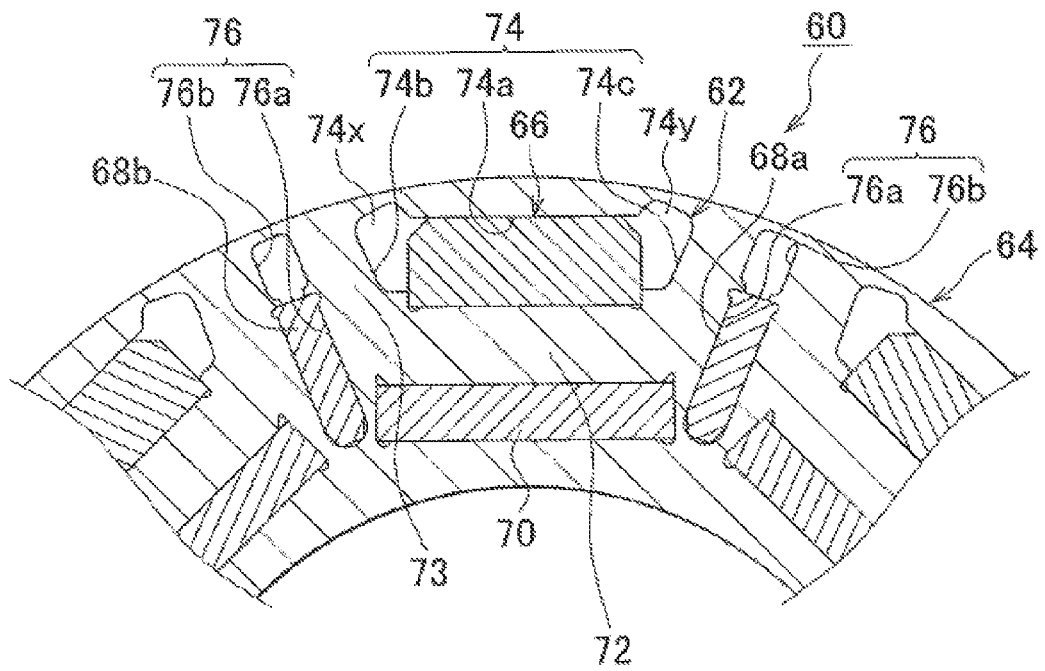
FIG. 6 is a diagram illustrating an enlarged view of one magnetic pole in a rotor of a conventional example.

The magnetic path entrance portions 43 are explained in detail next with reference to FIG. 4. FIG. 4 is a diagram illustrating an enlarged view of one of the magnetic path entrance portions 43 in FIG. 3.

As described above, each magnetic path entrance portion 43 is formed between a magnetic pole outward side portion 40a of the generally triangular through-hole 40 forming the low permeability region 38 and the corresponding circumferential-direction magnet 28 and pocket portion 48. The magnetic pole outward side portion 40a of each through-hole 40 is formed, in a straight line shape, from an inner-periphery-side end portion 41 of the through-hole 40. The magnetic pole outward side portion 40a of each through-hole 40 extends in a direction that forms a predetermined angle θ with respect to an imaginary straight line 50 that passes through the above-described inner-periphery-side end portion 41 and is parallel to the long-side lateral faces of the circumferential-direction magnets 28. As described below, the predetermined angle θ is a value, obtained experimentally, by simulation or the like, that is appropriate for effectively increasing reluctance torque during high load operation of the rotary electric machine. By virtue of such an angle, the magnetic path entrance portion is formed to have a width (width in a direction perpendicular to the longitudinal direction of the elongated rectangular shape) W1, at the inner-periphery-side end portion 41, that is wider than a width W2 at the outer-periphery-side end portion 45 of the magnetic pole outward side portion 40a. That is, the magnetic path entrance portions 43 are formed in such a manner that the width of the magnetic path entrance portion becomes narrower towards the outer peripheral face 13 of the rotor core 12. A comparison of the above configuration with that of conventional examples has revealed that low permeability regions 38 is extended further towards the circumferential-direction magnets 28 than in the case where the magnetic path entrance portions 43 are formed to have constant width W1, as described in the section on related art.

In the rotor 10 of the embodiment, the amount of q-axis magnetic flux that flows from the stator 2 to the magnetic path entrance portions 43 increases upon high load operation of the rotary electric machine 1 that is provided with the rotor 10. In addition, at an inner-periphery-side portion 54, denoted by the dotted ellipse in FIG. 4, of each magnetic path entrance portions 43, the part of the magnetic flux generated from the circumferential-direction end portion of the central magnet 26 that leaks via the bridge portion 42 and via the periphery of the through-hole 40 and the magnetic flux from the circumferential-direction magnet are added to the q-axis magnetic flux, so that the density of the magnetic flux at the inner-periphery-side portion 54 increases. Under such conditions, the q-axis inductance Lq may drop and reluctance torque may be harder to achieve during high load operation.

In the rotor 10 of the embodiment, however, the magnetic path entrance portions 43 are formed so as to become narrower towards the outer periphery, as described above, and the low permeability regions 38 is extended outward in the circumferential direction. As a result, it is possible to make the amount of reduction in d-axis inductance Ld of the magnetic pole 24 greater than the amount of reduction $\Delta Lq$ in q-axis inductance L. That is, there holds the relationship $\Delta Ld > \Delta Lq$, wherein $\Delta Ld$ denotes the amount of reduction in d-axis inductance Ld. Accordingly, this allows increasing the reluctance torque during high load operation of the rotary electric machine 1 because the reluctance torque increases proportionally to the difference between the q-axis inductance Lq and the d-axis inductance Ld. In turn, this allows enhancing the torque generation efficiency during high load operation.

FIGS. 5A and 5B illustrates such a relationship between the d-axis inductance Ld and the q-axis inductance Lq. FIG. 5A is a graph illustrating an example of the embodiment, and FIG. 5B is a graph illustrating an example where the magnetic path entrance portion has constant width. In both graphs, the abscissa axis represents current flowing through the stator coil 3, and the ordinate axis represents inductance L. In FIG. 5A, for comparison purposes, the solid lines represent the variations in d-axis inductance, in q-axis inductance, and in difference therebetween, in the case of the embodiment, and the dotted lines represent the variations in d-axis inductance, in q-axis inductance, and in difference therebetween, in the case where the magnetic path entrance portion has a constant width.

Referring to FIG. 5B, firstly, it can be seen that the d-axis inductance Ld of the rotor is constant at both regions of low-medium load operation and high load operation, and the q-axis inductance Lq decreases as electric current increases and the magnetic flux amount flowing from the stator increases, so that the d-axis inductance Ld exerts a predominant influence on the difference (Lq−Ld) between the q-axis inductance Lq and the d-axis inductance Ld relating to reluctance torque in a high load operation region.

Referring to FIG. 5A, by contrast, it can be seen that when the d-axis inductance Ld in the magnetic pole 24 is reduced over the entire operation region, the inductance difference (Lq−Ld) increases, and accordingly the reluctance torque increases. In particular in a high load operation region, as described above, there holds the relationship $\Delta Ld > \Delta Lq$ and (Lq−Ld) increases as indicated by arrow 56, corresponding to the difference between $\Delta Ld$ and $\Delta Lq$. This allows increasing, as a result, reluctance torque during high load operation of the rotary electric machine.

While preferred embodiments have been described above, the invention is not limited to the above configuration, and can be modified and improved in various ways.

In the description of the embodiment above, for example, the edge portion 40a of the through-hole 40 that delimits the low permeability regions 38 is formed in a straight-line shape, but may be formed in a curved shape that bulges gently towards the circumferential-direction magnets 28.

In the description of the embodiments above, the pocket portion 36 and the low permeability hole 40 are opposed to each other across the bridge portion 42, but the pocket portions 36 and the low permeability holes 40 may communicate with each other, without any bridge portion interposed therebetween.

A cross section perpendicular to an axial direction of the rotor core, of the central magnet and the pair of circumferential-direction magnets, may have an elongated rectangular shape.

The width may be a width in a direction perpendicular to a longitudinal direction of the elongated rectangular shape.

The low permeability regions may include respective holes formed in the rotor core; the holes may have each a straight-line shaped edge portion that is opposed to the magnetic-pole inward side face of a respective circumferential-direction magnet, across a respective magnetic path entrance portion; and the edge portion of each low permeability region may extend in a direction that runs along an inner periphery-side end portion of the rotor core, in the radial direction, and that forms a predetermined angle with respect to an imaginary straight line that is parallel to a magnetic-pole inward side face of a respective circumferential-direction magnet.

The holes may be through-holes of substantially triangular shape formed running through the rotor core, in the axial direction, in the vicinity of the end portions of the central magnet in the circumferential direction; the edge portions of the low permeability regions may each be one side edge portion of each through-hole; and the through-holes may each be adjacent, across a respective bridge portion of the rotor core, to respective pocket portions being low-permeability portions that are formed on both sides of the central magnet, in the circumferential direction.

The magnetic pole may further have a magnetic flux suppression hole that is formed between inner-periphery-side end portions of the pair of circumferential-direction magnets, in the radial direction of the rotor core, in such a manner so as to extend inward in the radial direction.

The magnetic pole may be configured to be line-symmetrical with respect to a magnetic pole centerline being a radial direction line, along the radial direction, that passes through a center of the magnetic pole in the circumferential direction.

In the rotor for a rotary electric machine according to an aspect of the invention, the magnetic path entrance portions may be core regions that are part of the rotor core.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A rotor for a rotary electric machine, comprising:
   a rotor core including a plurality of magnetic poles provided at intervals in a circumferential direction of the rotor core and at an outer periphery of the rotor core, wherein
   each of the magnetic poles includes:
   a central magnet provided in the vicinity of an outer peripheral face of the rotor core, a pair of circumferential-direction magnets disposed on both sides of the central magnet in the circumferential direction such that a mutual spacing between the pair widens towards an outer periphery of the rotor core, a pocket portion having a lower permeability than that of a magnetic material of which the rotor core is made, disposed at an outer periphery side of each of the circumferential-direction magnets, and a low permeability region provided in the vicinity of each of end portions of the central magnet in the circumferential direction, and having a permeability lower than that of the magnetic material, of which the rotor core is made, and the rotor core is formed in such a manner that a width of a magnetic path entrance portion that is formed between a magnetic-pole inward side face, which is an inward side face of each of the circumferential-direction magnets and an inward side face of each of the pocket portions in the circumferential direction of the magnetic pole, and the low permeability region adjacent to the magnetic-pole inward side face becomes narrower towards the outer peripheral face of the rotor core, where the magnetic-pole inward side face has a straight-line shape formed by one inward side face of the circumferential-direction magnet and one inward side face of the pocket portion.

2. The rotor for a rotary electric machine according to claim 1, wherein a cross section, perpendicular to an axial direction of the rotor core, of each of the central magnet and the pair of circumferential-direction magnets, has an elongated rectangular shape.

3. The rotor for a rotary electric machine according to claim 2, wherein the width of the magnetic path entrance portion is a width in a direction perpendicular to a longitudinal direction of the elongated rectangular shape.

4. The rotor for a rotary electric machine according to claim 1, wherein the low permeability region includes a hole formed in the rotor core;

the hole has a straight-line shaped edge portion that is opposed to the magnetic-pole inward side face of the circumferential-direction magnet, across the magnetic path entrance portion; and the edge portion of the low permeability region extends in a direction that forms a predetermined angle with respect to an imaginary straight line that passes through an inner-periphery-side end portion of the edge portion and is parallel to the magnetic-pole inward side face of the circumferential-direction magnet.

5. The rotor for a rotary electric machine according to claim 4, wherein the hole is a through-hole of substantially triangular shape formed so as to pass through the rotor core in the axial direction, in the vicinity of the end portion of the central magnet in the circumferential direction;

the edge portion of the low permeability region is a side edge portion of the through-hole; and the through-hole is adjacent to a second pocket portion, which is a low-permeability portion formed on each side of the central magnet in the circumferential direction, with a bridge portion of the rotor core interposed between the through hole and the pocket portion.

6. The rotor for a rotary electric machine according to claim 1, wherein the magnetic pole further includes a magnetic flux suppression hole that is formed between inner-periphery-side end portions of the pair of circumferential-direction magnets, in a radial direction of the rotor core, so as to extend inward in the radial direction.

7. The rotor for a rotary electric machine according to claim 1, wherein the magnetic pole is configured to be line-symmetrical with respect to a magnetic pole centerline, which is a radial direction line extending along a radial direction of the rotor core and passing through a center of the magnetic pole in the circumferential direction.

8. The rotor for a rotary electric machine according to claim 1, wherein the magnetic path entrance portion is a core region that is part of the rotor core.

9. The rotor for a rotary electric machine according to claim 1, wherein a part of the magnetic flux generated from an outer peripheral end portion of the central magnet flows to an inner periphery side portion of the magnetic path entrance portion.

* * * * *